March 23, 1965 J. C. BRAMER, JR 3,175,209
COLOR DISPLAY PANEL WITH BISTABLE MULTI-VIBRATOR
MATRIX LAMP CONTROL
Filed Jan. 18, 1963 3 Sheets-Sheet 1

INVENTOR.
JOHN C. BRAMER, JR.
BY
Rupert J. Brady
ATTORNEY

March 23, 1965 J. C. BRAMER, JR 3,175,209
COLOR DISPLAY PANEL WITH BISTABLE MULTI-VIBRATOR
MATRIX LAMP CONTROL
Filed Jan. 18, 1963 3 Sheets-Sheet 2

FIG. 2

INVENTOR.
JOHN C. BRAMER, JR.
BY
*Rupert J. Brady*
ATTORNEY

United States Patent Office 3,175,209
Patented Mar. 23, 1965

3,175,209
COLOR DISPLAY PANEL WITH BISTABLE MULTI-
VIBRATOR MATRIX LAMP CONTROL
John C. Bramer, Jr., Pittsburgh, Pa., assignor to Data-
graphics Inc., Pittsburgh, Pa., a corporation of
Pennsylvania
Filed Jan. 18, 1963, Ser. No. 252,471
9 Claims. (Cl. 340—334)

This invention relates broadly to an illuminated display panel, and more particularly to an illuminated color display panel provided with selective color illumination control for selected areas thereon.

In the modern day marketing industry the services of a new breed of business specialists, known as the marketing geographer, are being used at an increasing rate for selecting new merchandising outlets, relocating old ones, and evaluating the trading areas from which a merchandiser draws his customers or a manufacturer sells his products, thus replacing the old hit-and-miss approach in deciding where to locate a new store, or the like, with new precision business techniques for scientifically selecting the optimum location or marketing area. In general, information such as where customers live, shop, how much they buy, impact of competition, accessibility, growth potential, and the like, is ploted on maps by these specialists and is related to other marketing data. These plots may, for instance, result in overlapping areas in different colors on the map with each colored area representing a different type of information. From these plots it is then possible for the specialist to establish primary, secondary and fringe trading areas in a visual pattern, thus greatly aiding in evaluating and choosing the optimum location for a new store or the optimum area for stressing a new sales promotion program, or the like.

The illuminated color panel of the present invention, when used in conjunction with a transluscent or transparent map-overlay, enables the marketing geographer or mapmaker to visually display the overlapping areas relating to different information as illuminated areas of different colors on the panel, which will create illuminated areas of still different colors when portions of the areas overlap. Thus, various selected portions of the color panel related to areas on the map can be illuminated in different colors coded to specific information, resulting in a visual color display of existing trading areas of the locale represented by the map, coming trends or changes in these areas, etc., to thus visually assist the geographer, for example, in selecting a new business location in the community.

The color panel of the invention may be of any desired size or shape and in lieu of having areas of different colors displayed on the face thereof at desired locations, the panel may be adapted for displaying various illuminated symbols, such as numbers at selected locations on the panel face, with the illuminated symbols or illuminated colored areas being controlled by electrical remote control. It is to be understood that the illuminated color panel of the invention is adaptable to many different uses in addition to those mentioned, such as for visually demonstrating the magnitude of a company's sales by geographical location according to a color code with a transparent map of the sales area overlapping the viewing panel, or the panel may be used for visual display of bar graphs such as for comparing sales records for various years. It is, therefore, obvious that the panel is adaptable for many uses.

It is therefore an object of the present invention to provide a construction of illuminated display panel which permits the selection of colors and/or symbols for illumination display at a particular location on the panel. Another object of the invention is to provide a construction of illuminated display panel in which the selected illuminated areas remain visually displayed until purposely erased or extinguished.

A further object of the invention is to provide a construction of illuminated display panel in which a plurality of areas can be selectively illuminated to display different colors or symbols by easily operable remote control means.

Still a further object of the invention is to provide a construction of illuminated color panel in which selected illuminated areas of the panel can be extinguished.

Other and further objects of the invention reside in the construction of the area illumination selection circuits and the illuminated area extinguishing or erase circuits as set forth more fully in the specification hereinafter following by reference to the accompanying drawings, in which:

FIG. 2 is an electrical schematic diagram of the color panel control circuit of the invention, with repetitious portions of the circuit omitted for clarity in illustration;

Figure 1:
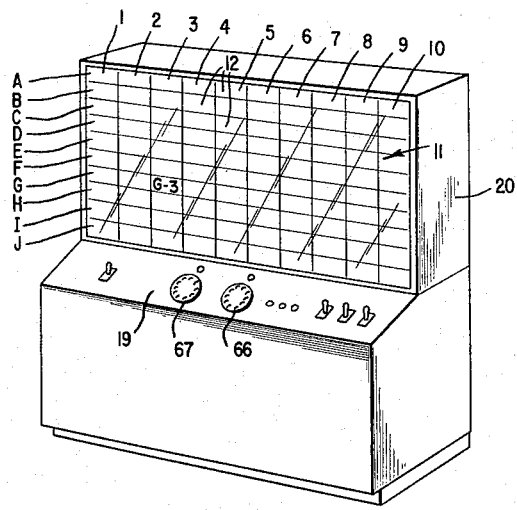
FIG. 1 is a perspective view of the illuminated display panel of the invention.

Referring to the drawings in greater detail, the preferred form of the illuminated color panel of the invention comprises an upper body portion 20 having a flat, rectangular, transluscent panel, such as illustrated at 11, in FIG. 1, divided into a plurality of equal areas or sections, represented generally by reference numeral 12. The color panel of FIG. 1, for purposes of illustration, has been shown divided into one hundred equal rectangular areas 12 displayed in ten rows, having designations A–J, and ten columns designated by reference numerals 1–10, respectively. Thus, each individual panel area 12 has an individual letter and number designation, such as panel area G–3, designating the panel area at the intersection of row G and column 3. However, it is to be understood that the display panel can be divided into any number and/or shape areas, depending upon the particular application, and the arrangement shown and described herein is to be considered only for purposes of illustration.

A group of three colored lights 13, 14 and 15, consisting of the primary colors red, green and blue, respectively, with each light having an individual electronic relay energizing circuit 16, 17 and 18, respectively, as shown in FIG. 2, are positioned behind each of the one hundred panel areas 12 of the transluscent panel 11 with the lights behind each area being selectively illuminable to any of seven combinations of the three primary color lights by electrical remote control circuits contained in the base portion 19 of the color panel. The preferred arrangement of the color display panel and actuating controls is shown in FIG. 1, but it is to be understood that the upper body portion 20 carrying the display panel 11 may be separate and far removed from the control circuit panel or base portion 19 and either portion may contain the bulk of the electrical control circuit components. Also, if a particular application deems it desirable or necessary, the separate areas or sections 12 of the display panel, or groups thereof, may be physically located at remote locations from each other.

However, it is preferred that the only electrical components carried by the upper body portion 20 consists of the three electronic relays 16, 17 and 18 and associated interconnecting wiring and colored lights 13, 14 and 15 connected behind each panel area 12.

Figure 3:
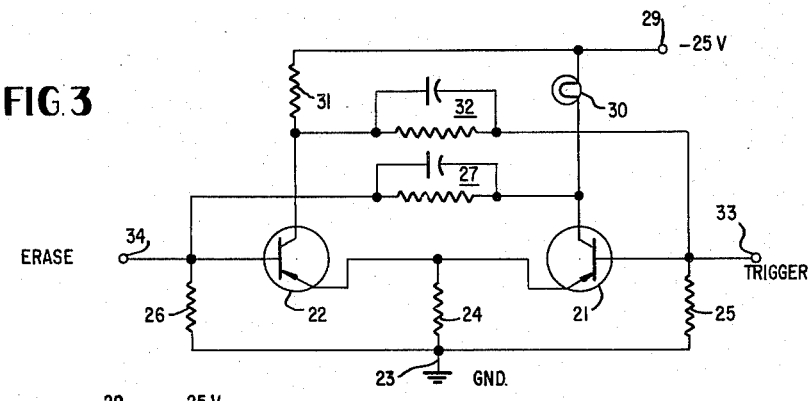
FIG. 3 is an electrical schematic of a saurated flip-flop circuit of the type used in the circuit of FIG. 2.

In the preferred form of the invention, each of the electronic relays 16, 17 and 18, behind each panel section, consists of identical saturated RC coupled transistorized flip-flop circuits as shown in FIG. 3. This is a standard type switching circuit symmetrical in design and comprising identical transistors 21 and 22 having their emitters connected to ground buss 23 through common emitter resistor 24 and their bases connected to ground 23 through resistors 25 and 26. The collector of transistor 21 is connected to the base of transistor 22 through RC circuit 27 and is connected to a source of negative potential 28, such as −25 volts D.C., through terminal 29 and incandescent lamp 30 which serves as the current limiting resistor. Incandescent lamp 30 corresponds to the primary color lights 13, 14 and 15. The collector of transistor 22 is connected to terminal 29 through current limiting resistor 31 and is connected to the base of transistor 21 through RC circuit 32. As stated the circuit is symmetrical with corresponding components being of equal value with the resistance of lamp 30 and resistor 31 being substantially equal. For operation of the saturated flip-flop circuit a positive input trigger or pulse is applied to the base of transistor 21 through trigger input terminal 33 to render transistor 21 conducting and illuminating lamp 30 in the collector circuit thereof. Since the circuit is designed as a saturated flip-flop, transistor 21 and lamp 30 will remain ON, even after the input trigger is removed, until an erase signal is applied to the base of transistor 22 through erase pulse input terminal 34 to switch the state of the flip-flop, rendering transistor 22 conducting and turning OFF transistor 21 and lamp 30. The corresponding circuit terminals have been designated by similar reference numerals on the schematic blocks 16, 17 and 18 in FIG. 2, each of which corresponds to the circuit of FIG. 3. Thus in operation whenever an input trigger is applied to terminal 33 of relay circuit 16, 17 and/or 18, the corresponding light 13, 14 and/or 15 will be illuminated and will remain illuminated until an erase pulse is applied to terminal 34 of the corresponding relay or relays.

Referring to the circuit of FIG. 2, the selection of a particular panel location is accomplished by means of two stepping relays, indicated generally at 35 and 36. Stepping relay 35 provides selection of the desired row position and stepping relay 36 provides selection of the desired column position of the area to be illuminated.

Row selection stepping relay 35 for the panel control circuit illustrated is a three-pole, ten position stepping relay having three movable wiper arms 37, 38 and 39, simultaneously movable step-by-step on each energization of stepping relay coil 40 and resettable to the initial starting position upon energization of the row reset coil 41 which is selectively connectable to potential source 42 by means of row reset switch 43. Row stepping relay 35 is provided with three fixed contacts 44, 45 and 46 for each row position on the display panel with the wiper arms 37, 38 and 39 disposed to be selectively electrically connected thereto.

The fixed contact 44 for each row on the display panel is electrically connected to the trigger input terminal 33 of each relay circuit 16 in the corresponding row which controls all of the red lights 13 in that row. Fixed contact 45 is connected to the trigger input terminal 33 of each relay circuit 17 in the corresponding row which controls the illumination of the green lights 14 in that row, while fixed contact 46 is electrically connected to the trigger input terminal 33 of each relay circuit 18 in the corresponding row which controls the illumination of the blue lights 15 in that row. In the position of the relay shown in FIG. 2, the relay wiper arms are shown connected with the fixed contacts for applying an input trigger pulse to the relay circuits of row A.

The movable wiper arms 37, 38 and 39 of row stepping relay 35 are commonly connected through individual color selection switches 47, 48 and 49, corresponding to the red, green and blue illumination relay circuits, to a source of positive potential, such as a 1 volt battery, as indicated at 50. The other terminal of battery 50 is connected to the movable wiper arm 51 of column stepping relay 36 which is progressively advanced in step-by-step fashion into electrical contact with fixed contact 53–62, connected to similarly designated circuits, respectively connecting the ground busses 23 of relays in columns 1–10, as shown, each time column stepping relay coil 63 is energized. Column stepping relay 36 is also provided with a reset coil 64 which resets the wiper arm 51 to a column 0 position each time the coil is energized by closing column reset switch 65 which is connected to potential source 42. In the position shown, column stepping relay 36 completes the trigger circuit to close relay circuits in column 1 of the display panel.

The stepping relays 35 and 36 are normally actuated by means of any current pulse sources, such as telephone-type dial switches 66 and 67 illustrated in FIG. 2. It is, however, to be understood that other pulse actuating sources for the relays can be utilized. In the embodiment shown, row selector dial 66, having a dial position A–J corresponding to each row of relays in the display panel, is disposed momentarily close the corresponding switch 66', once for each dial position registered and since switch 66' is connected to potential source 42 stepping relay 40 will be energized each time the switch is closed. For instance, if a panel area in row I is to be energized this letter is dialed and switch 66' will be consecutively closed nine times to step the wiper arms 37, 38 and 39 of row stepping relay 35 into contact with the fixed contacts of row I. In a similar manner, column selector dial 67 is disposed to momentarily close switch 67' for each dial position to thus connect stepping coil 63 to potential source 42 upon each closure to step wiper arm 51 of column stepping relay 36 into contact with the desired column circuit. For instance, if column 2 was dialed on dial switch 67, wiper arm 51 would be stepped into contact with fixed contact and circuit 54 to connect the wiper arm to the ground circuit of the relays in column 2. Thus column stepping relay 36 provides connection to ground of the triggering current circuit of the light actuating relay circuits in a particular column and row stepping relay 35 provides connection of the light illuminating relay circuits in a particular row to the triggering current source 50. Therefore, both of the stepping relays are used to complete the triggering current circuit.

As mentioned in connection with FIG. 3, the terminals 29 of all relays in a particular column are connected to a source of negative potential such as a 25 volt battery 28. As shown, each battery 28, for each column, has a switch connected in series therewith which is normally closed during circuit operation.

A separate erase circuit is provided for extinguishing the lamps and consists of separate conductors 68–77 connecting all of the erase pulse input terminals 34 of all relay circuits in rows A–J, respectively, commonly connected to one terminal of a source of positive potential 78 such as a 1 volt battery. The opposite terminal of the battery is commonly connected to the movable contacts of a ten-pole, single-throw erase switch, indicated generally at 79 which are selectively connectable to the column ground circuits 53–62 to simultaneously complete the erase trigger circuit for all relays in a particular column upon the closing of the selective pole of erase switch 79. If all poles of the switch 79 are closed simultaneously all illuminated lights on the display panel are extinguished, since all of the flip-flop circuits will be switched to position opposite to that required for illumination of the colored lights.

The operation of the color display panel of the invention to illuminate a chosen section or area 12 of the panel is as follows:

(1) The row position of a chosen area is dialed on dial switch 66 according to a letter code, or the like, and this causes row stepping relay 35 to connect the circuit for triggering current source 50 to the flip-flop relay circuits in that row through the color selection switches 47, 48 and 49.

(2) The column position of the chosen area is then dialed on column dial switch 67 according to a number code and this causes the column stepping relay 36 to connect the triggering current circuits of the flip-flop relays in that particular column to the ground terminal of the triggering current source 50. At this stage, all of the flip-flops are still in the OFF position and no lights are as yet illuminated.

(3) The chosen selection of colors in which the chosen area is to be illuminated is then obtained by depressing the correct combination of color selection switches 47, 48 and 49 to complete the triggering current circuit to the corresponding flip-flop relay circuits, thus switching the same and illuminating the corresponding colored lights, which remain lighted even during the process of illuminating other chosen areas until the erase current pulse is applied thereto. For instance, if it is desired to illuminate the chosen area in blue-green, then switches 48 and 49 are depressed, thus switching relays 17 and 18 and illuminating green light 14 and blue light 15 in the chosen area.

(4) The row reset and column reset swtiches 43 and 65 are then closed, resetting the stepping relays 35 and 36 to their starting positions, not shown.

(5) Another chosen area is then illuminated in a selected color by repeating the above steps.

(6) The panel is erased, that is, all of the lights extinguished after they are no longer needed by closing the poles of erase switch 79 corresponding to the columns in which lights have previously been illuminated, thus turning all flip-flops to the OFF position and darkening the panel.

The flip-flop relays are therefore actuated by low voltage triggering current pulses emanating from the battery 50 and after they have switched to the ON or illuminated position, they provide constant current to the colored incandescent lights 13, 14 and 15 from battery 28 to maintain the same in the illuminated state until a similar low voltage erasing current pulse is applied to the relay circuits from battery 78 by means of erase switch 79.

Figure 4:
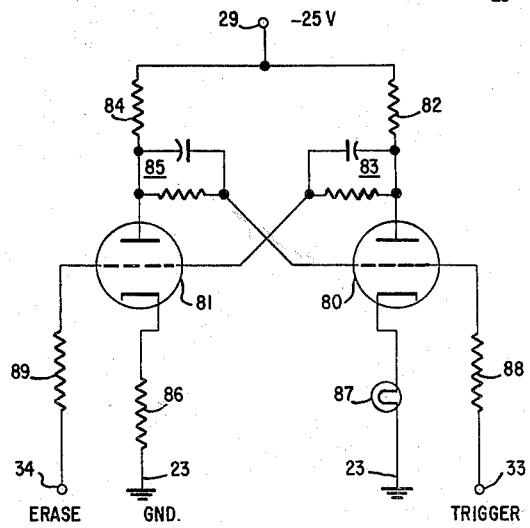
FIG. 4 is an electrical circuit diagram of a modified flip-flop circuit for use in lieu of the transistorized circuit of FIG. 3.

In lieu of the transistor flip-flop circuit shown in FIG. 3, the vacuum tube flip-flop circuit shown in FIG. 4 can be used for the relay circuits 16, 17 and 18 in the circuit diagram of FIG. 2. This alternative form of flip-flop relay circuit is conventional in design and operates in substantially the same manner as the circuit of FIG. 3 except that vacuum tube triodes 80 and 81 are used in lieu of transistors 21 and 22. In this modified circuit the plate of tube 80 is connected to terminal 29 through resistor 82 and is also connected to the grid of tube 81 through the RC circuit designated at 83. In similar manner, the plate of tube 81 is connected to terminal 29 through plate resistor 84, and is connected to the grid of tube 80 through RC circuit 85. The cathode of tube 81 is connected to ground 23 through cathode resistor 86 while the cathode of tube 80 is connected to ground buss 23 through incandescent lamp 87 which corresponds to any of the colored lights 13, 14 or 15. The ground buss 23 through incandescent lamp 87 which corresponds the light 87 is applied to the grid of tube 80 through resistor 88, and the erase pulse for turning tube 80 OFF and causing the current flow through tube 81 is applied to the grid of tube 81 through resistor 89.

In lieu of directly operating lamps 13, 14 and 15 (30, 87) the flip-flop relay circuits of FIGS. 3 and 4 may be used to actuate electromagnetic relays by placing a relay coil in the circuits of FIGS. 3 and 4 in place of lamps 30 and 87, respectively. The electromagnetic relays in turn can be used to close electrical contacts to operate any electrical device requiring greater currents than could be tolerated or supplied by the primary flip-flop circuits. The electromagnetic coils might also be the actuating coils for electromagnetic indicators or for the various positions in digital or letter-digital readouts. Therefore, this same circuit arrangement could be used for controlling many different types of displays.

Figure 5:
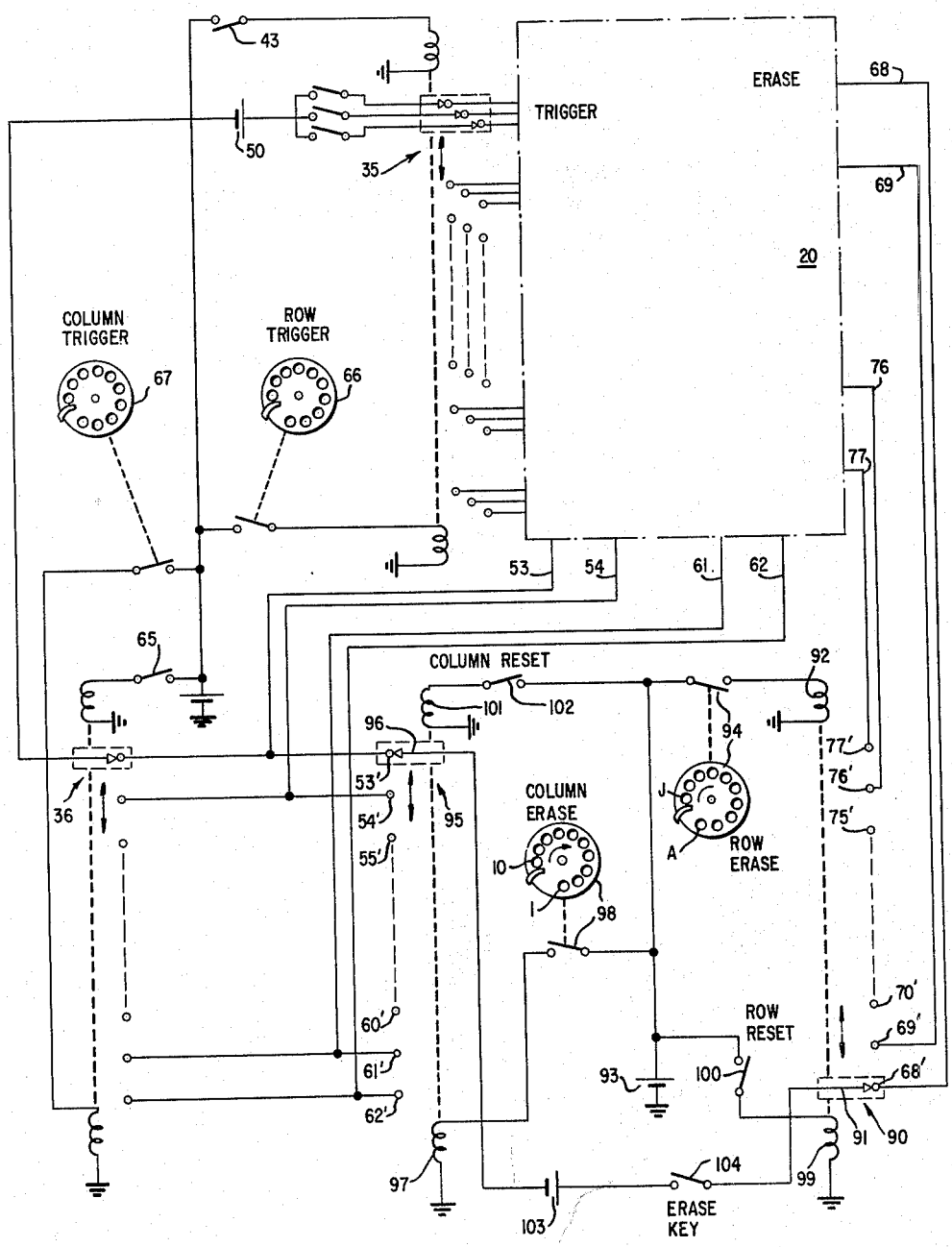
FIG. 5 is an electrical schematic diagram, with parts omitted, showing a modified form of the color panel control circuit of FIG. 2.

A modified or more sophisticated form of the circuit of FIG. 2 has been shown in FIG. 5, wherein, for purposes of clearer illustration, some identical portions of the circuit have been eliminated. It is to be understood that the box 20 enclosed by dot-dash lines is to include all the circuitry shown enclosed within dot-dash line 20 in FIG. 2. The flip-flop triggering circuit for illuminating the desired colored lights, including stepping relays 35 and 36, and row and column selector dial switches 66 and 67, is the same as that shown in FIG. 2, with the difference between the circuits of FIGS. 2 and 5 residing in the erase circuitry. In this form of the invention, the erase circuit includes row and column selector dials used in connection with an erase key, very similar to the trigger circuit arrangement to provide for selectively erasing the color and/or symbol displayed at a particular display panel area 12 so that the color or symbol at that area can be changed without extinguishing an entire column of illuminated lights.

In the erase circuit of FIG. 5, the separate conductors 68–77 connecting the erase terminals of all relay circuits in the individual rows are connected to fixed contacts 68′–77′, respectively, of the single-pole, ten-position row erase stepping relay 90. This relay is provided with a wiper contact 91 selectively movable into electrical engagement with fixed contacts 68′–77′ by stepping relay coil 92 upon energization thereof by battery 93 through closure of telephone-type dial row erase switch 94. As in the triggering circuit, row erase switch 94 will close and energize coil 92, once for each row position, traversed by the dial. In similar manner, a column erase stepping relay 95 is provided with a wiper arm 96 to make selective contact with fixed contacts 53′–62′ which are respectively connected to the column ground circuits 53–62 of the relays in columns 1–10. Movement of wiper arm 96 is controlled by stepping coil 97 which in turn is energized by battery 93 through column erase telephone-type dial switch 98 in the same manner as previously described in connection with the row erase switch and the triggering circuit dial switches. Relay 90 is provided with reset coil 99 selectively connectable to battery 93 by row reset switch 100 for resetting the stepping switch back to the starting position and relay 95 is provided with reset coil 101 which is connectable to battery 93 through column reset switch 102 for resetting the column erase stepping switch back to its start position. A source of positive potential 103 and area erase key 104 are connected in series between relay wiper arms 91 and 96, such that upon selection of the desired row and column by stepping relays 90 and 95, the relays illuminating a chosen area on the display panel can be switched to extinguish the lamps illuminated thereby upon closure of erase key 104 which applies a positive erase pulse to the relays selected by dial switches 94 and 98. Row erase stepping relay 90 will connect one end of the series circuit containing positive potential source 103 and erase key 104 with the erase input terminals 34 of the illumination control flip-flops in the selected row A–J by means of conductors 68–77, and column erase stepping relay 95 will complete the ground circuit of the erase pulse circuit to the ground circuit 53–62 of the selected column. Upon closing of key 104 those flip-flop circuits at the interesction of the chosen column and row, which are disposed in the ON state, will be switched to the non-conducting state to extinguish the lamps. Thus in this form of the invention the erase switch 79, of FIG. 2, has been replaced by two stepping relays to provide selected extinguishing of lights at a chosen panel location.

The operation of the control panel may be carried out automatically by using the output of a digital computer or other impulse generators, by well known state-of-the-art techniques, since all of the display panel operations are carried out by single switch-closings performed in a certain sequence. This, therefore, makes the circuit of the invention particularly adaptable for control by an automatic programmed device.

The main improvement of the color display panel of the present invention is therefore the specific arrangement of electronic relays and circuitry which permits the selection of a particular area of the panel to be illuminated and the selection of the color and/or symbol to be displayed at the chosen area by sequential current impulses. As many areas as desired can be illuminated at any location on the color panel to display relatively large illuminated areas, such as would be required by the marketing geographer as previously mentioned, and the colors of specific areas can be blended or contrasted according to the particular application. The illuminated areas and/or symbols remain displayed until purposely erased by a novel erase circuit which allows removal of the data displayed at chosen areas, one area at a time.

While the invention has been described in certain preferred embodiments it is realized that modifications can be made and it is to be understood that no limitations upon the invention are intended other than may be imposed by the scope of the appended claims.

What I claim as new and desire to secure by Letters Patent of the United States, is as follows:

1. An illuminated display panel comprising, a plurality of groups of saturated flip-flop circuits disposed in rows and columns, each of said saturated flip-flop circuits being normally conducting and having a first and second stable state and normally disposed in the second stable state, a light connected with each of said saturated flip-flop circuits for illumination when said flip-flop circuit is switched to said first state, a source of potential, circuit-completing means connected at one end to said source of potential, first electrically actuated stepper means disposed to connect the other end of said circuit-completing means to the groups of saturated flip-flop circuits in any selected row, second electrically actuated stepper means disposed to selectively connect the opposite end of said source of potential to the groups of saturated flip-flop circuits in any selected column, whereby upon closing of said circuit-completing means selected saturated flip-flop circuits of the group of saturated flip-flop circuits at the intersection of the selected row and column are switched to the first state to illuminate selected lights at a selected point on the display panel.

2. An illuminated display panel as set forth in claim 1 in which the lights connected with the saturated flip-flop circuits in each group are of different colors, with the colored lights of each group of said plurality of groups being correspondingly the same.

3. An illuminated display panel as set forth in claim 1 in which said first and second electrically actuated stepper means are actuated by individual telephone-type dial switches operatively connected thereto.

4. An illuminated display panel as set forth in claim 1 in which said circuit completing means includes a plurality of switch means connected in separate circuits, a plurality of input circuits for each row with one saturated flip-flop circuit of each group in a row commonly connected to one of said plurality of input circuits, and said first stepper means disposed to connect said separate circuits to the plurality of input circuits of any selected row.

5. An illuminated display panel as set forth in claim 1, and circuit means connected to the rows and columns of said plurality of groups of saturated flip-flop circuits for switching all of the flip-flop circuits in said first state in a selected column to the second state to thereby extinguish all of the lights in the selected column.

6. An illuminated display panel as set forth in claim 1, including a series circuit having a second potential source and circuit closing means, a third electrically actuated stepper means disposed to connect one end of said series circuit to the groups of saturated flip-flop circuits in any selected row, and a fourth electrically actuated stepper means disposed to connect the opposite end of said series circuit to the groups of saturated flip-flop circuits in any selected column, whereby upon closing said circuit-closing means the illuminated lights at the intersection of the selected row and column are de-energized and the associated saturated flip-flop circuits are switched to the second state.

7. An illuminated display panel comprising a plurality of groups of flip-flop circuits disposed in rows and columns, each of said flip-flop circuits being normally conducting and having a first and second stable state and normally disposed in the second stable state, a light connected with each of said flip-flop circuits for illumination when said flip-flop circuit is switched to said first state, a source of potential, circuit-completing means connected at one end to said source of potential, first electrically actuated stepper means disposed to connect the other end of said circuit-completing means to the groups of flip-flop circuits in any selected row, second electrically actuated stepper means disposed to selectively connect the opposite end of said source of potential to the groups of flip-flop circuits in any selected column, whereby upon closing of said circuit-completing means selected flip-flop circuits of the group of flip-flop circuits at the intersection of the selected row and column are switched to the first state to illuminate selected lights at a selected point on the display panel.

8. An illuminated display panel comprising a plurality of groups of bistable multivibrator circuits disposed in rows and columns, each of said bistable multivibrator circuits being normally conducting and having a first and second stable state and normally disposed in the second stable state, a light connected with each of said bistable multivibrator circuits for illumination when said bistable multivibrator circuit is switched to said first state, a source of potential, circuit-completing means connected at one end to said source of potential, first electrically actuated stepper means disposed to connect the other end of said circuit-completing means to the groups of bistable multivibrator circuits in any selected row, second electrically actuated stepper means disposed to selectively connect the opposite end of said source of potential to the groups of bistable multivibrator circuits in any selected column, whereby upon closing of said circuit-completing means selected bistable multivibrator circuits of the group of bistable multivibrator circuits at the intersection of the selected row and column are switched to the first state to illuminate selected lights at a selected point on the display panel.

9. A display panel as set forth in claim 6, including separate means operatively connected for resetting each of said electrically actuated stepper means.

References Cited in the file of this patent
UNITED STATES PATENTS

| | | |
|---|---|---|
| 1,200,885 | Schmid | Oct. 10, 1916 |
| 1,999,810 | Hershey | Apr. 30, 1935 |
| 2,199,824 | Kinkead | May 7, 1940 |
| 2,340,559 | Pruyn et al. | Feb. 1, 1944 |
| 2,359,014 | Ward | Sept. 26, 1944 |
| 2,698,915 | Piper | Jan. 4, 1955 |
| 2,859,385 | Bentley | Nov. 4, 1958 |
| 2,892,968 | Kallmann | June 30, 1959 |